United States Patent [19]
Vanderslice et al.

[11] Patent Number: 5,630,602
[45] Date of Patent: May 20, 1997

[54] BEACH CARRY-ALL CART DEVICE

[76] Inventors: Claudia F. Vanderslice, 6 Kenton Ave., Pitman, N.J. 08071; John W. Fox, 306 Westwood Dr., Woodbury, N.J. 08096

[21] Appl. No.: 336,502

[22] Filed: Nov. 9, 1994

[51] Int. Cl.$^6$ ..................................... B62B 1/00
[52] U.S. Cl. .................... 280/47.26; 280/47.17; 280/47.2
[58] Field of Search ................ 280/30, 37, 47.131, 280/47.17, 47.18, 47.2, 47.26, 47.3, 47.31, 47.32, 78, DIG. 3; 248/98; 190/18 A

[56] References Cited

U.S. PATENT DOCUMENTS

| | | | |
|---|---|---|---|
| 1,276,322 | 8/1918 | Bullock | 280/DIG. 3 |
| 2,228,066 | 1/1941 | Tashbook | 280/DIG. 3 |
| 2,313,884 | 3/1943 | Mattoon | 280/47.26 |
| 2,437,029 | 3/1948 | Howard | 280/47.26 |
| 2,472,203 | 6/1949 | Friedmann et al. | 280/DIG. 3 |
| 2,840,142 | 6/1958 | Sands . | |
| 2,868,557 | 1/1959 | Klipp et al. | 280/DIG. 3 |
| 2,967,058 | 1/1961 | Hoffman, Jr. . | |
| 3,276,786 | 10/1966 | Olander | 280/47.26 |
| 3,443,397 | 5/1969 | Donovan et al. . | |
| 3,693,993 | 9/1972 | Mazzarelli et al. | 280/30 |
| 3,758,128 | 9/1973 | Stenwall | 280/47.3 |
| 3,997,213 | 12/1976 | Smith et al. | 297/118 |
| 4,703,944 | 11/1987 | Higson | 280/30 |
| 4,749,209 | 6/1988 | Edmonds | 280/652 |
| 4,887,837 | 12/1989 | Bonewicz, Jr. et al. | 280/47.26 |
| 5,040,807 | 8/1991 | Snover | 280/30 |
| 5,265,892 | 11/1993 | Said | 280/30 |
| 5,370,409 | 12/1994 | Latouche | 280/47.26 |

FOREIGN PATENT DOCUMENTS

| | | | |
|---|---|---|---|
| 0191885 | 8/1986 | European Pat. Off. | 190/18 A |
| 1180772 | 7/1959 | France | 280/DIG. 3 |
| 646685 | 11/1950 | United Kingdom | 280/DIG. 3 |
| 792897 | 4/1958 | United Kingdom | 280/DIG. 3 |
| 796520 | 6/1958 | United Kingdom | 280/DIG. 3 |

*Primary Examiner*—Brian L. Johnson
*Assistant Examiner*—Min Yu
*Attorney, Agent, or Firm*—Lennox & Murtha, P.A.; Thomas A. Lennox, Esq.

[57] ABSTRACT

A beach carry-all cart device is provided with a cloth bag extending upwardly from a base member which rides on a cylindrical wheel. The bag is unsupported except for a sleeve around a handle member which extends vertically to a handle grip into which a vertical slot is cut to receive cloth handles extending from the upper edge of the bag. Vertical zippers are provided along opposite side walls to expose the interior contents which typically are one or more beach chairs and other items.

19 Claims, 2 Drawing Sheets

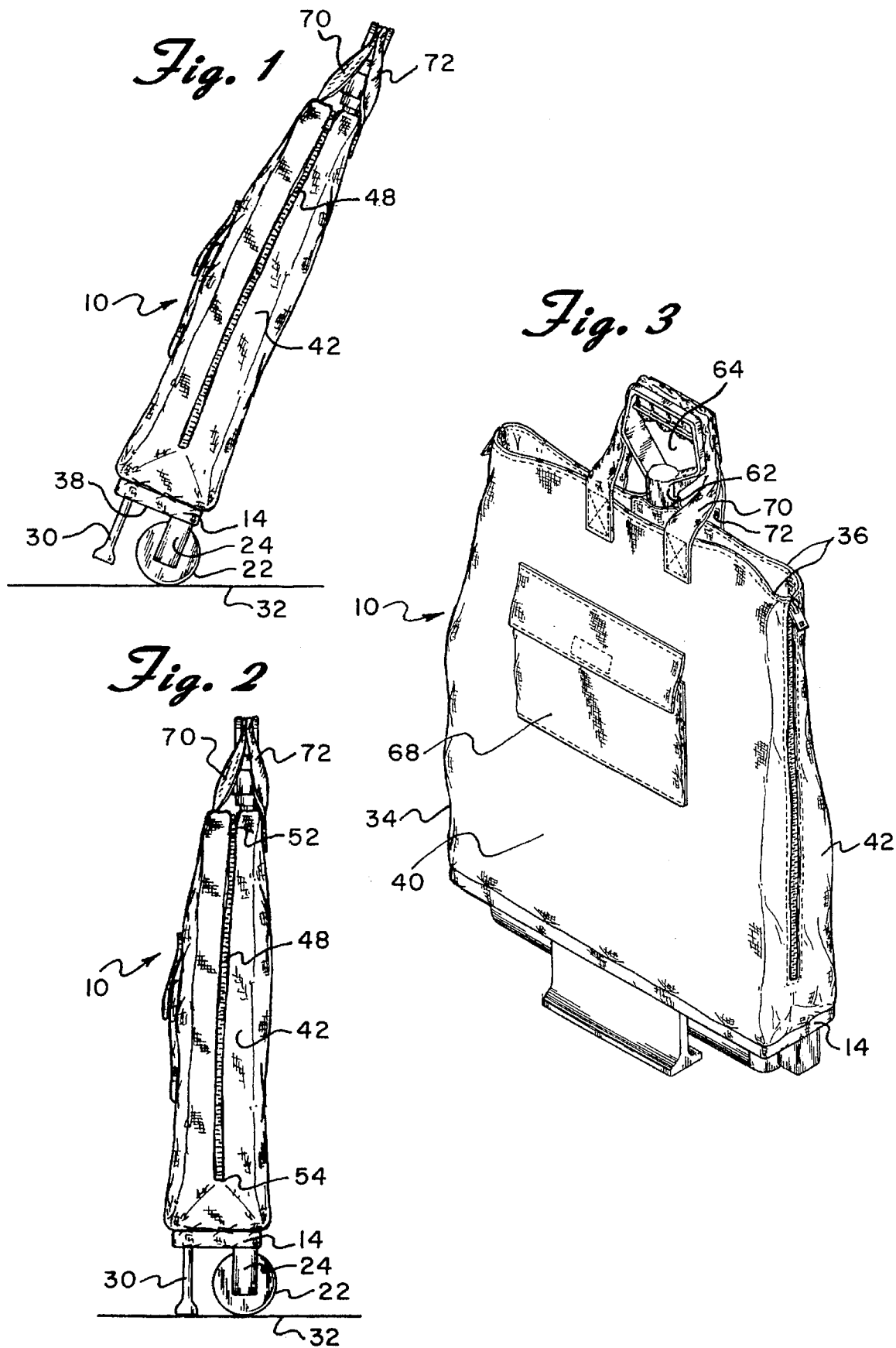

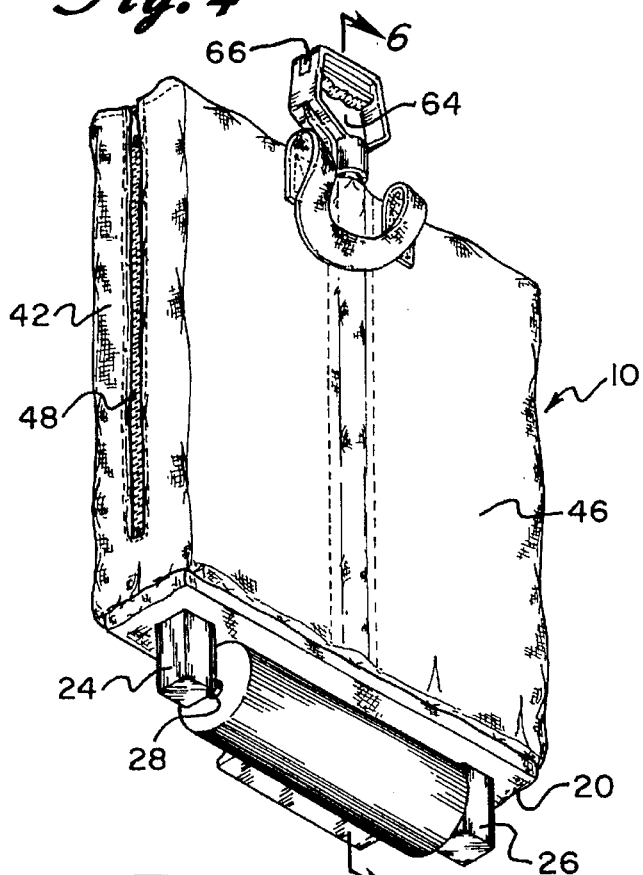
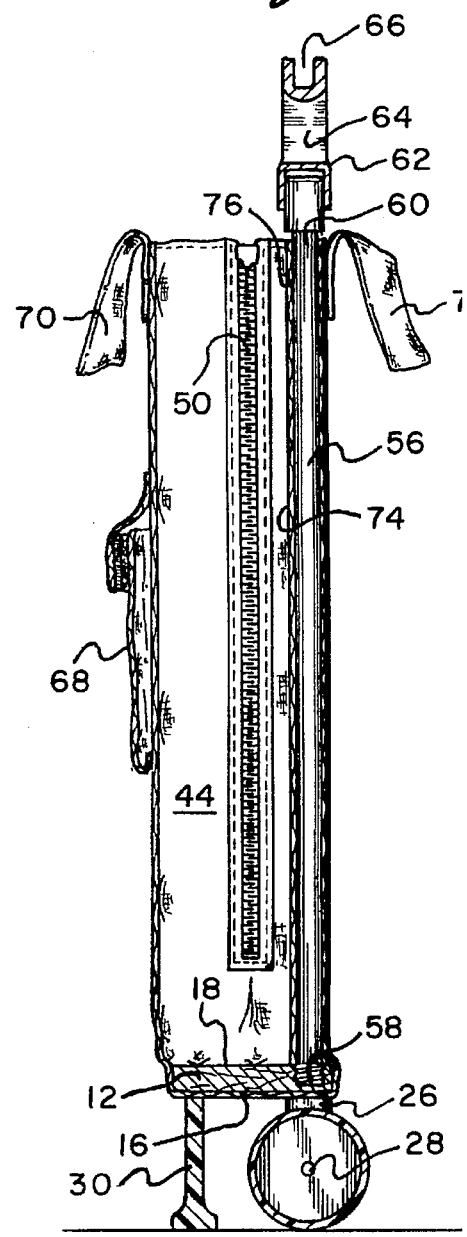
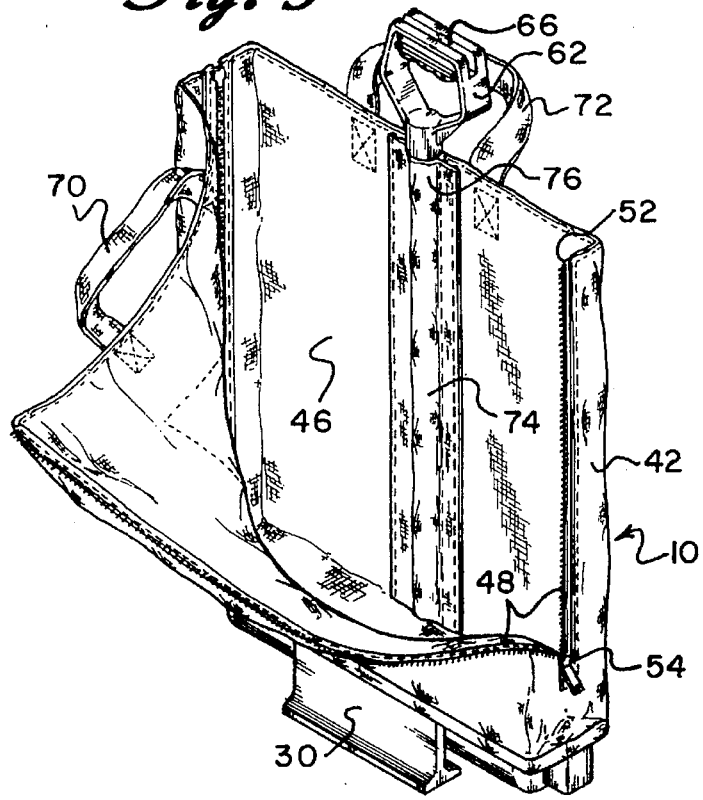

BEACH CARRY-ALL CART DEVICE

BACKGROUND OF THE INVENTION

This invention involves a carry-all cart device and, more particularly, a carry-all cart device suitable for beach use.

A variety of devices have been provided for carrying belongings back and forth to the beach. In some cases, the device has combined other uses such that it opens into a beach chair. However, these devices either do not effectively carry the belongings without the use of bungee cords, rope, or other tie-on devices or are not suitable for beach use. The sand and salt air quickly binds and corrodes most all hinges and other moving parts. Further, metal support members quickly rust or corrode making the device either unusable, or at least unsightly.

A carry-all device for beach use should be capable of safely carrying at least one and preferably a plurality of beach chairs, together with a variety of additional belongings including blankets, towels, toys, and other items without the need of cords.

U.S. Pat. No. 4,703,944 to Higson discloses a beach caddy which includes a chair rack, a table and openings to receive beach umbrellas and fishing poles. U.S. Pat. No. 3,997,213 to Smith et al. discloses a collapsible carry-all with a seat including a frame structure to support a cloth canvas seat to hold belongings. U.S. Pat. No. 2,840,142 describes a foldable beach cart with vertical side cross members and a rigid upper frame hinged at the corners to allow the device to fold up. U.S. Pat. No. 5,040,807 to Shover describes a combined beach chair and wheel barrow apparatus utilizing a cloth seat on which belongings can be carried. U.S. Pat. No. 3,693,993 to Mazzarelli et al. describes a convertible beach tote cart which serves as a cot or a lounging chair using adjustable straps to secure objects on the cart which rolls on rollable cylinder 22. That cylinder may be used as part of the present invention. U.S. Pat. No. 2,967,058 to Hoffmann, Jr. describes a combination beach barrow and chair again providing a hammock-type cloth seat on which items may ride to and from the beach. U.S. Pat. No. 5,265,892 to Said discloses a folding cart chair with a flexible cargo container supported by a rigid frame structure. U.S. Pat. No. 4,749,209 to Edmonds describes a collapsible fishing gear and load bearing carriage constructed of a rigid frame. U.S. Pat. 3,443,397 to Donovan et al describes a cloth enclosure for a barrel cooler into which ice is placed around the beer keg with flexible cloth handles for lifting.

None of these devices and apparatuses satisfy the needs described above, nor attain the objects described herein below.

SUMMARY OF INVENTION

It is an object of the invention to provide a carry-all device that can be easily pushed or pulled over essentially any terrain, including street or sidewalk surfaces, as well as beach sand.

It is a further object of the present invention to provide a carry-all device that can easily support and carry two or more beach chairs plus additional items.

It is an additional object of the present invention to provide a carry-all device which can be easily opened to expose all of its contents once the destination is reached.

It is a particular object of the present invention to provide a carry-all device that requires essentially no supporting framework and when it is empty, it can still be easily transported or rolled on its wheel mechanism. Further, when the device contains at least one beach chair, the bag is fully supported.

It is an additional object of the present invention to provide a carry-all device that will stand upright in a vertical position, whether it is full or empty.

It is a particular object to provide a carry-all device wherein a single handle member at least partially supports the flexible bag, preferably made of cloth. It is an object to provide that the handle be detachable and removable from the device allowing the cloth bag to be wrapped up for storage or packaging.

An aspect of the invention is an all terrain carry all cart device that includes a base elongate member including two ends, a bottom surface and an upper surface. The device further includes wheel means depending downwardly from said bottom surface to support the device and allow the device to travel freely over loose sand and an open topped flexible bag attached to the base member. The bag includes a height terminating in an upper edge, an elongate bottom, side walls extending upwardly from the bottom to the upper edge, and at least one zipper means alternatively opening and closing adjacent edges of a vertical slit extending proximately from the bottom upwardly the height of a side wall and opening at the upper edge. The device further includes a handle member attached vertically at a lower end to the base member and including an upper end at a height at least as high as the upper edge of the bag. The device also includes handle means attached on the upper end of the handle member to allow said means to be gripped and to allow the device to be pulled or pushed while riding on the wheel means. The device further includes a vertical sleeve attached on a side wall of the bag terminating proximate the upper edge of the bag, wherein the handle member is threaded through the sleeve.

It is preferred that the device further include a foot member depending from the bottom surface of the base member adjacent the wheel means, the member being of sufficient size to allow the device to balance resting on the combination of the foot member and the wheel means. It is further preferred that the bag further include at least one flexible inverted "U" shaped strap handle attached to the upper edge, and the handle means comprises a slot of sufficient size to receive the strap handle. It is more preferred that the bag include two flexible inverted "U" shaped strap handles attached to the upper edge on opposite sides of the bag, and that the slot be of sufficient size to receive both of the strap handles. It is further preferred that the side walls of the bag include a front side wall, two end side walls extending upwardly from the ends of the base member, and a rear wall on which the sleeve is attached, and their are two zipper means, each zipper means closing a slit on an opposite end side wall. It is also preferred that the elongate bottom of the bag include a width of about four to about eight inches. It is further preferred that the lower end of the handle member be detachably attached to the base member. It is also preferred that there be no vertical support members supporting the bag other than the handle member. It is further preferred that there be no horizontal support members proximate the upper edge of the bag. It is also preferred that the bag be constructed of cloth. It is further preferred that the wheel means comprises a cylindrical drum wheel rotating on an axle.

Another aspect of the invention is an all terrain carry all cart device that includes a base elongate member including two ends, a bottom surface and an upper surface, wheel means depending downwardly from said bottom surface to support the device and allow it to travel freely over loose sand, and an open topped flexible bag attached to the base member. The bag includes a height terminating in an upper edge, an elongate bottom, side walls extending upwardly from the bottom to the upper edge, and at least one zipper means alternatively opening and closing adjacent edges of a vertical slit extending proximately from the bottom upwardly the height of a side wall and opening at the upper edge. The device further includes a handle member attached vertically at a lower end to the base member and including an upper end at a height at least as high as the upper edge of the bag. The device further includes handle means attached on the upper end of the handle member to allow said means to be gripped and to allow the device to be pulled or pushed while riding on the wheel means. The device further includes attachment means on a side wall of the bag to hold the handle member to the bag proximate the upper edge of the bag. The device includes no vertical support members supporting the bag other than the handle member.

It is preferred that the side walls of the bag include a front side wall, two end side walls extending upwardly from the ends of the base member, and a rear wall on which the attachment device is attached, and that there be two zipper means, each zipper means closing a slit on an opposite end side wall. It is further preferred that the attachment means include a vertical sleeve attached on a side wall of the bag terminating proximate the upper edge of the bag, wherein the handle member is threaded through the sleeve.

Yet another aspect of the invention is an all terrain carry all cart device including a base elongate member that includes two ends, a bottom surface and an upper surface, wheel means depending downwardly from said bottom surface to support the device and allow the device to travel freely over sand, a foot member depending from the bottom surface of the base member adjacent the wheel means, the member being of sufficient size to allow the device to balance resting on the combination of the foot member and the wheel means, a handle member attached vertically at a lower end to the base member and including a height terminating at an upper end proximate the upper edge of the bag, handle means attached on the upper end of the handle member to allow said means to be gripped and allow the device to be pulled or pushed while riding on the wheel means, the handle means including a slot, and an open topped flexible bag attached to the base member. The bag includes a height terminating in an upper edge, an elongate bottom, side walls extending upwardly from the bottom to the upper edge, the side walls comprising a front side wall, two end side walls extending upwardly from the ends of the base member, and a rear wall on which the sleeve is attached, two zipper means alternatively opening and closing adjacent edges of vertical slits extending proximately the height of opposite end side walls opening at the upper edge, and at least one flexible inverted "U" shaped strap handle attached to the upper edge of the bag, the strap being of sufficient length to engage into the slot in the handle means. The device further includes a vertical sleeve attached on a side wall of the bag terminating proximate the upper edge of the bag, wherein the handle member is threaded through the sleeve. There are no vertical support members to support the bag other than the handle member.

BRIEF DESCRIPTION OF THE DRAWINGS

FIG. 1 is a right side elevational view of a carry-all device tilted for pulling or pushing.

FIG. 2 is a similar right side elevational view thereof with the device standing up.

FIG. 3 is a top, front and right side perspective view thereof.

FIG. 4 is a rear, bottom, right side perspective view thereof.

FIG. 5 is a perspective view similar to that of FIG. 3 wherein one zipper has been opened to expose the interior of the bag.

FIG. 6 is a vertical cross-sectional view taken along lines 6—6 of FIG. 3.

DESCRIPTION OF PREFERRED EMBODIMENTS

Cart device 10 or parts thereof are shown in all six Figures. In FIG. 1, device 10 is being held at an angle so that it can be pushed or pulled on surface 32 on cylindrical wheel 22. In FIG. 2, device 10 is resting on wheel 22 and foot 30 in an upright position on surface 32. Device 10 is constructed on elongate base member 12 which is a wood, composition board or plastic member about two foot long, about six to seven inches wide and about one inch thick. Base member 12 includes a left end 20, right end 14, bottom 16 and top 18. Wheel 22 is a hollow rigid or semirigid polymeric plastic cylinder closed on both ends rotating on axle 28 which is supported by downwardly depending right member 24 and left member 26, each rigidly attached to bottom 16 of base member 12. Foot 30 is an injection molded rigid plastic foot rigidly attached to the bottom 16 of base panel 12 and extending downwardly to provide a bearing surface the same height as the bottom of wheel 22. Bag 34 is constructed of polyvinyl chloride coated fabric which provides a water resistant protection for the contents of the device. Bag 34 has an open top bounded by upper peripheral edge 36 and has bottom 38 which encloses and protects base member 12. Front side wall 40 has pocket 68 on its outside surface for carrying small items. Right side end wall 42 is about the same width as base member 12 as is left inside side wall 44. Rear side wall 46 extends the full height of bag 34 and is supported by handle member 56. Although the figures show bag 34 standing upwardly, the cloth is not self-supporting and without certain shaped articles, such as beach chairs, or bags of foodstuffs inside, the upper corners of the bag flop downwardly. The device is intended to be used full of articles which hold the upper corners of the bag upright. Beach chairs, one, two or even three in number support the bag perfectly. For clarification purposes, particular contents of the bag are not illustrated, but it should be clear that a beach chair would hold the corners of bag 34 upwardly as it is pictured in FIG. 3 and 4. Standard plastic zipper 48 provides closure and easy access to the interior of the bag through side end wall 42. Similarly, zipper 50 opens and closes inside wall 44. Each zipper is about twenty-eight inches long opening essentially the entire height of bag 34 which is about thirty inches. Lower end 54 of zipper 48 is close to bottom 38 of bag 34 while zipper top 52 opens at upper edge 36. Handle member 56 is a three-quarter inch circular rod of wood or plastic connected through thread connection 58 into panel base member 12. It is preferred that this screw attachment be similar to that used for many broom handles and that it be easily detached by unscrewing the handle from base member 12. Top end 60 of handle member 56 is permanently attached to handle 62 which is a shape similar to that used for shovels with opening 64 through which a person's fingers may be inserted while the upper portion of the "D" shape is grasped for pulling or pushing device 10. Vertical slot 66 is cut downwardly from the upper gripping portion of handle 62 and as shown in FIGS. 1 through 3. Optional inverted "U" shaped cloth handles 70 and 72 are pulled upwardly and fit into slot 66. Handles 70 and 72 are attached at their ends to front side walls 40 and 46 respectively extending upwardly from upper edge 36 of a sufficient length to allow them to engage slot 66. Vertical sleeve 74 is sewn on the inside of rear side wall 46 of bag 34 as shown in FIGS. 5 and 6. Sleeve 74 extends the entire height of bag 34 and encases the entire length of handle member 56 from its attachment to base member 12 to upper end 60 which is proximate to the upper end 76 of sleeve 74 opening at upper edge 36. As shown in FIG. 5, zipper 48 has been opened exposing essentially the entire contents of bag 34. When the device is used to go to the beach, beach chairs which essentially fill the entire interior dimensions of bag 34 may easily be removed. While the exact size of bag 34 is not critical, certain sizes are very effective. For example, the depth of bag from front wall 40 to rear wall 46 is preferably about four inches to about eight inches and, more preferably, about six to seven inches which is more than sufficient to carry a couple of beach chairs of essentially any construction. Likewise, standard paper shopping bags are about seven inches wide at their smallest dimension. Therefore, foodstuffs can be easily stored in the device either in paper bags or loose. When the bag is about seven inches wide, up to three beach chairs of most constructions may be carried. When heavier items are carried, handles 70 and 72 reduce the strain on handle member 56, although for lighter loads, the handles are not necessarily used.

While this invention has been described with reference to specific embodiments disclosed herein, it is not confined to the details set forth and the patent is intended to include modifications and changes which may come within and extend from the following claims.

We claim:

1. An all terrain carry all cart device comprising:
 a base elongate member comprising two ends, a bottom surface and an upper surface,
 wheel means depending downwardly from said bottom surface to support the device and allow the device to travel freely over loose sand,
 an open topped flexible bag attached to the base member, the bag comprising:
  a height terminating in an upper edge,
  an elongate bottom,
  side walls each extending upwardly the height from the bottom to the upper edge, and
  at least one zipper means alternatively opening and closing adjacent edges of a vertical slit extending a distance proximate the height of a side wall and opening at the upper edge,
 first support means for holding up the flexible bag consisting of:
  a single elongate vertically disposed handle member comprising a lower end attached to a median section of the base member, and an upper end section extending upwardly to a height at least as high as the upper edge of the bag, and
  a vertical sleeve attached on the rear wall of the bag terminating proximate the upper edge of the bag, wherein the handle member is threaded through the sleeve, and
 handle means attached on the upper end section of the handle member to allow said means to be gripped and to allow the device to be pulled and pushed while riding on the wheel means and said handle member and said handle means being the only rigid support for holding up the flexible bag.

2. The device of claim 1 further comprising a foot member depending from the bottom surface of the base member adjacent the wheel means, the member being of sufficient size to allow the device to balance resting on the combination of the foot member and the wheel means.

3. The device of claim 1 comprising second support means to detachably connect the flexible bag to the handle means comprising at least one flexible inverted "U" shaped strap handle attached to the upper edge of the flexible bag, and a slot in the handle means of sufficient size to receive the strap handle.

4. The device of claim 3 wherein the second support means comprises two flexible inverted "U" shaped strap handles attached to the upper edge on opposite sides of the bag, and wherein the slot is of sufficient size to receive both of the strap handles.

5. The device of claim 1 wherein there are two zipper means, each zipper means closing a slit on an opposite side wall.

6. The device of claim 1 wherein the elongate bottom of the bag comprises a width of about four to about eight inches.

7. The device of claim 1 wherein the lower end of the handle member is detachably attached to the base member.

8. The device of claim 1 wherein the composition of the bag and the upper edge of the bag are flexible with the handle member holding up the bag preventing the bag from collapsing.

9. The device of claim 1 wherein the bag is constructed of cloth.

10. The device of claim 1 wherein the wheel means comprises a cylindrical drum wheel rotating on an axle.

11. An all terrain carry all cart device comprising:
 a base elongate member comprising two ends, a bottom surface and an upper surface,
 wheel means depending downwardly from said bottom surface to support the device and allow the device to travel freely over loose sand,
 an open topped flexible bag attached to the base member, the bag comprising:
  a height terminating in an upper edge,
  an elongate bottom,
  a rear wall,
  side walls each extending upwardly the height from the bottom to the upper edge, and
  at least one zipper means alternatively opening and closing adjacent edges of a vertical slit extending a distance proximate the height of a side wall and opening at the upper edge,
 first support means to support the bag consisting of:
  a single elongate vertically disposed handle member comprising a lower and attached to a median section of the base member, and an upper end section extending upwardly to a height at least as high as the upper edge of the bag, and
 attachement means on the rear wall of the bag to hold the handle member to the bag,
  wherein the composition of the bag and the upper edge of the bag are flexible with the handle member holding up the bag preventing the bag from collapsing, and
 handle means attached on the upper end section of the handle member to allow said means to be gripped and to allow the device to be pulled and pushed while riding on the wheel means and a second support means to detachably connect the flexible bag to the handle means comprising at least one flexible inverted "U" shaped strap handle attached to the upper edge of the flexible bag, and a slot in the handle means of sufficient size to receive the strap handle.

12. The device of claim 11 further comprising a foot member depending from the bottom surface of the base member adjacent the wheel means, the member being of sufficient size to allow the device to balance resting on the combination of the foot member and the wheel means.

13. The device of claim 11 wherein the second support means comprises two flexible inverted "U" shaped strap handles attached to the upper edge on opposite sides of the bag, and wherein the slot is of sufficient size to receive both of the strap handles.

14. The device of claim 11 wherein there are two zipper means, each zipper means closing a slit on an opposite side wall.

15. The device of claim 11 wherein the lower end of the handle member is detachably attached to the base member.

16. The device of claim 11 wherein the attachment means comprises a vertical sleeve attached on the rear wall of the bag terminating proximate the upper edge of the bag, wherein the handle member is threaded through the sleeve.

17. An all terrain carry all cart device comprising:

a base elongate member comprising two ends, a bottom surface and an upper surface, wheel means depending downwardly from said bottom surface to support the device and allow the device to travel freely over sand, a foot member depending from the bottom surface of the base member adjacent the wheel means, the member being of sufficient size to allow the device to balance resting on the combination of the foot member and the wheel means, an open topped flexible bag attached to the base member, the bag comprising:
a height terminating in an upper edge,
an elongate bottom,
a rear wall,
side walls extending upwardly from the bottom to the upper edge, the side walls comprising a front side wall, two end side walls extending upwardly from the ends of the base member, and a rear wall, two zipper means alternatively opening and closing adjacent edges of vertical slits extending proximately the height of opposite end side walls opening at the upper edge, and at least one flexible inverted "U" shaped strap handle attached to the upper edge of the bag, first support means for holding the flexible bag consisting of:

a single elongate vertically disposed handle member comprising a lower end attached to a medium section of the base member, and an upper end section extending upwardly to a height at least as high as the upper edge of the bag, and a vertical sleeve attached on the rear wall of the bag terminating proximate the upper edge of the bag, wherein the handle member is threaded through the sleeve.

wherein the composition of the bag and the upper edge of the bag are flexible with the handle member holding up the bag preventing the bag from collapsing, and handle means attached on the upper end section of the handle member to allow said means to be gripped and allow the device to be pulled or pushed while riding on the wheel means, the handle means comprising a slot, and second support means comprising the strap being of sufficient length to engage into the slot in the handle means to provide auxiliary support for the flexible bag.

18. The device of claim 17 wherein there are two flexible inverted "U" shaped strap handles each attached to the upper edge on opposite sides of the bag, and wherein the slot is of sufficient size to receive both of the strap handles.

19. The device of claim 17 wherein the lower end of the handle member is detachable attached to the base member.

* * * * *